United States Patent [19]

Konishi et al.

[11] Patent Number: 4,653,454

[45] Date of Patent: Mar. 31, 1987

[54] METHOD AND APPARATUS FOR CONTROLLING FUEL INJECTION QUANTITY INTO A DIESEL ENGINE

[75] Inventors: Yoshimune Konishi, Okazaki; Nobuhito Hobo, Inuyama; Yoshihiko Tsuzuki, Toyota; Narutoshi Kameoka, Kariya; Masahiko Miyaki, Oobu; Hiroshi Koide, Okazaki, all of Japan

[73] Assignees: Nippondenso Co., Ltd., Kariya; Toyota Jidosha Kabushiki Kaisha, Toyota, both of Japan

[21] Appl. No.: 797,802

[22] Filed: Nov. 13, 1985

[30] Foreign Application Priority Data

Nov. 15, 1984 [JP] Japan ............................ 59-241081

[51] Int. Cl.$^4$ ........................................... F02M 39/00
[52] U.S. Cl. ................................. 123/506; 123/494; 123/500; 73/119 A
[58] Field of Search ............... 123/506, 494, 500, 501; 73/119 A

[56] References Cited

U.S. PATENT DOCUMENTS

| 4,395,987 | 8/1983 | Kobayashi | 123/506 |
| 4,505,240 | 3/1985 | Shiwoda | 123/506 |
| 4,546,749 | 10/1985 | Igashira | 123/506 |

FOREIGN PATENT DOCUMENTS

| 3,312,282 | 10/1983 | Fed Rep of Germany | 123/506 |
| 3,401,751 | 7/1984 | Fed Rep of Germany | 123/506 |
| 58-187537 | 11/1983 | Japan | 123/506 |
| 59-221,432 | 12/1984 | Japan | 123/506 |
| 6,017,252 | 1/1985 | Japan | 123/506 |
| 59-221432 | 12/1984 | Japan | 123/506 |
| 60-17252 | 1/1985 | Japan | 123/506 |

*Primary Examiner*—Carl Stuart Miller
*Attorney, Agent, or Firm*—Cushman, Darby & Cushman

[57] ABSTRACT

Disclosed is a fuel injection quantity control system incorporated with a fuel injection pump with a solenoid-operated spill valve wherein a control signal is generated for cutting off a fuel supply to engine cylinders when a rotational phase angle of a drive shaft of the fuel injection pump is coincident with a desired spill phase angle determined in accordance with engine operating conditions. The desired spill phase angle, i.e., the opening timing of the spill valve is controlled in accordance with the rotational variations of the fuel injection pump. The desired spill phase angle is divided by unit angle corresponding to a detection period of rotational angle signals produced in accordance with the rotation of the pump drive shaft, obtaining a quotient and a remainder angle. The remainder angle is converted into a time on the basis of an engine speed. The generation of the control signal basically occurs upon the elapse of the converted time after the count of rotational angle signals is coincident with the quotient. If the engine operating condition varies immediately prior to the coincidence therebetween, the control signal is generated immediately after the coincidence or upon the elapse of a predetermined time period thereafter.

14 Claims, 14 Drawing Figures

METHOD AND APPARATUS FOR CONTROLLING FUEL INJECTION QUANTITY INTO A DIESEL ENGINE

BACKGROUND OF THE INVENTION

The present invention relates to fuel injection quantity control apparatus and method for a diesel engine, and in particular to a method and apparatus for optimally controlling the fuel injection quantity into cylinders of the diesel engine in accordance with engine operating conditions.

A system for controlling fuel injection quantity into cylinders of a diesel engine of a motor vehicle is known in which an electronically controlled injection system incorporated with a distribution type fuel injection pump wherein fuel is injected into the cylinders in accordance with the operation of a fuel injection valve such as solenoid-operated valve.

One example of such prior art system for controlling fuel injection quantity is disclosed in Japanese Patent Provisional publication No. 58-187537, in which the timing of the solenoid-operated valve, i.e., fuel spilling timing is controlled in accordance with engine rotational speed at the time. More specifically, the timing control is effected so as to energize the solenoid-operated spill valve upon elapse of a predetermined time period after the detection of a reference signal produced each time the engine crank shaft rotates by a predetermined angle, the predetermined time period being measured by operating a timer counter provided in a microcomputer in response to the generation of the reference signal.

Such prior art system would suffer no problem as long as the engine rotation is smooth and has no variations. However, the engine is actually subjected to rotational variations or irregularities in its one cycle of the operation and rapid variations of engine rotational speed. These variations cause the occurrence of injection timing errors, thus resulting in worsening the fuel injection quantity control from the viewpoint of accuracy.

SUMMARY OF THE INVENTION

It is accordingly an object of the present invention to provide new and improved fuel injection quantity control method and apparatus which overcome the above-described disadvantage inherent in the prior art control system.

More specifically, the present invention provides fuel injection quantity control method and apparatus capable of supplying an optimal fuel amount to a diesel engine, irrespective of the rapid engine speed variations, by controlling the opening timing of a solenoid-operated spill valve in accordance with the variations of engine operating conditions.

The technique of the present invention involves generating a control signal on the basis of a phase angle of rotation of a drive shaft of a fuel injection pump in order to control the energization timing of a solenoid-operated spill valve for cutting off a fuel supply to engine cylinders. The generation of the control signal occurs when a rotational phase angle of the fuel injection pump is coincident with a desired spill phase angle corresponding to an optimal fuel injection amount determined in accordance with engine operating conditions.

According to the present invention, a fuel injection quantity control system comprises means for producing a reference rotational angle signal at a reference angle of rotation of the injection pump drive shaft, means for producing a rotational angle signal for each predetermined rotational angle of the injection pump drive shaft, a timer for measuring time independently of the operation of the fuel injection pump, and a control unit for generating a control signal at a desired spill phase angle of rotation of the pump drive shaft for the energization of the solenoid-operated spill valve resulting in cutting off a fuel supply to engine cylinders and in obtaining a desired fuel injection quantity.

A feature of the present invention is that the desired spill phase angle, i.e., the opening timing of the solenoid-operated spill valve is controlled in accordance with the rotational variations of the fuel injection pump. The desired spill phase angle is divided by predetermined unit angle, obtaining a quotient and a remainder angle. The remainder angle is converted into a time period on the basis of the engine rotational speed at that time. The rotational angle signals from the rotational angle producing means are counted which are produced after the generation of a reference angle signal. The control signal for the energization of the solenoid-operated spill valve is basically generated upon the elapse of the converted time period after the count of the rotational angle signals is coincident with the quotient. If the engine operating condition varies immediately prior to the coincidence between the count value and quotient and it is therefore required to advance the solenoid-operated valve opening timing, the control signal is generated immediately after the coincidence or upon the elapse of a predetermined time period thereafter. The predetermined time period is determined as short as possible.

This feature provides an advantage in that an actuate fuel injection quantity control can always be ensured without being subject to considerable errors relating to the fuel spilling timing, irrespective of the rotational variations or irregularities in the engine cycle and rapid engine rotational speed variations.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE PRESENT INVENTION

Figure 1:
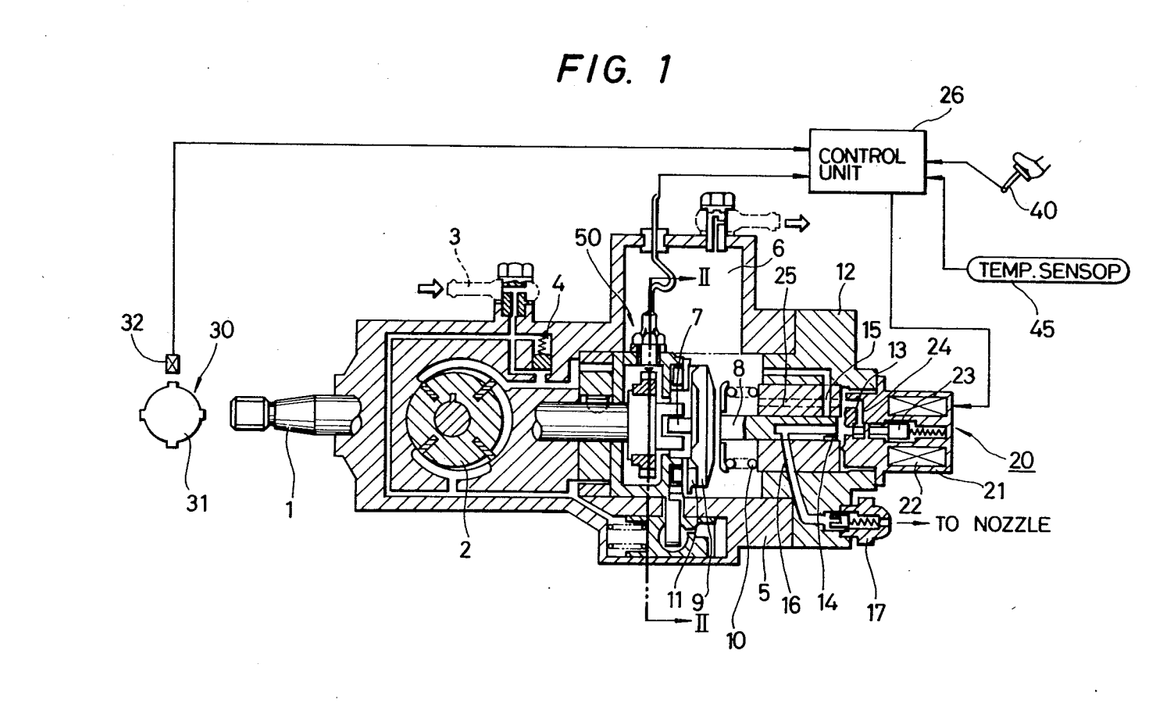
FIG. 1 is a schematic block diagram of a fuel injection quantity contol system according to the present invention incorporated with a fuel injection system including a fuel injection pump with a fuel metering solenoid-operated spill valve.

Referring now to FIG. 1, there is illustrated a fuel injection system incorporated with a fuel injection quantity control system according to the present invention. The fuel injection control system is of the type which has a fuel spilling solenoid-operated valve, and includes a drive shaft 1 driven by a diesel engine, not shown, for rotating a vane type feed pump 2. The feed pump 2 introduces fuel from a fuel suction port 3 and pressurizes the sucked fuel under a certain pressure through a fuel pressure regulator valve 4, from which the fuel is supplied under the pressure into a fuel chamber 6 defined in a pump housing 5. The drive shaft 1 drives a pressure-feed plunger 8 through a coupling 7. The coupling 7 is arranged to cause the pressure-feed plunger 8 to rotate therewith but allow the pressure-feed plunger 8 to move freely axially. The pressure-feed plunger 8 has integrally a face cam 9 which is pressed resiliently against cam rollers 11 under the bias force of a spring 10. The cam rollers 11 and the face cam 9 constitute a known mechanism for converting the rotation of the drive shaft 1 into reciprocating movement of the plunger 8 in the axial direction thereof. The converting mechnism is constructed such that the plunger 8 makes as many reciprocating movements as there are the engine cylinders in one rotation of the plunger as the cam projections of the face cam 9 ride over the cam roller 11. The pressure-feed plunger 8 has a portion fitted in a head 12 fixed to the pump housing 5, defining a pump chamber 13 in the head 12. The pressure-feed plunger 8 has a plurality of fuel inlet slots 14 at an outer peripheral surface thereof, opening into the pump chamber 13. When one of the fuel inlet slots 14 communicates with an fuel inlet port 15 connected to the fuel chamber 6 in an intake stroke of the plunger 8, fuel is introduced from the fuel chamber 6 into the pump chamber 13. On the other hand, when the fuel in the pump chamber 13 is compressed in a compression stroke of the plunger 8, the fuel is fed from distribution ports 16 through pressure-feed valves 17 to fuel injection valves, not shown, from which the fuel is injected into the engine cylinders, respectively.

The pump chamber 13 is combined with a fuel metering mechanism 20 which has a solenoid-operated valve 21 including a coil 22 and needle valve 23. When a current is passed through the coil 22, the needle valve 23 is lifted, thereby allowing fuel to return from the pump chamber 13 under high pressure through spill passages 24 and 25 into the fuel chamber 6. Accordingly, the fuel injection is terminated when the solenoid-operated valve 21 is actuated in the compression stroke of the pressure-feed plunger 8. The timing at which the solenoid-operated valve 21 is energized is determined by an electronic control unit, or microcomputer 26. The electronic control unit 26 is supplied with various signals indicative of engine operating conditions from various engine sensors including a reference engine rotational angle sensor 30, an accelerating pedal sensor 40, a rotational angle sensor 50 and the other sensors such as temperature sensor 45. The various signals are used for controlling the energization of the fuel-metering solenoid-operated valve 21, and the control is performed in accordance with a control program which will be described in detail hereinafter.

The reference angle sensor 30 comprises a detector 32 and a disk 31 mounted on an engine cam shaft, not shown, for example, which rotates in unison with the pump drive shaft 1 in phase therewith and has four angularly equally spaced peripheral projections, for example, for a four-cylinder engine. The detector 32 comprising a well known electromagnetic pickup is provided in the vicinity of and facing to the circumference of the disk 31 in order to detect, for example, each bottom dead center of each cylinder.

Figure 2:
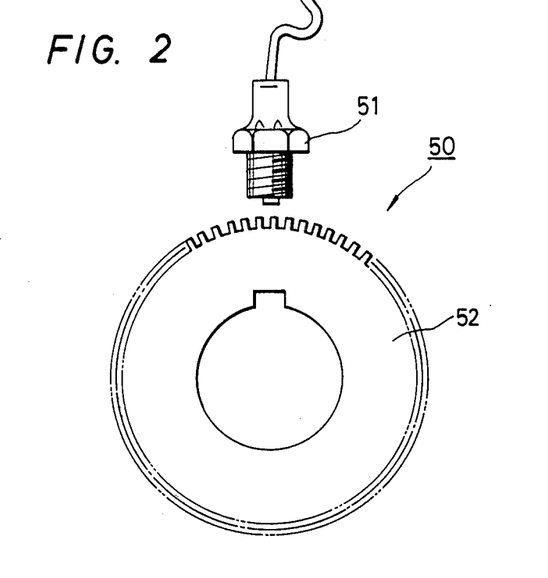
FIG. 2 is a cross-sectional view taken along line II—II of FIG. 1, showing a rotational angle sensor.

On the other hand, as shown in FIG. 2 which is a cross-sectional view taken along line II—II of FIG. 1, the rotational angle sensor 50 comprises a disk 52 integrally mounted on the pump drive shaft 1 for co-rotation therewith and having a plurality of peripheral teeth, and proximity detector 51 which is of the same construction as that of the detector 32. The rotational angle sensor 50 produces one output signal each time the pump drive shaft 1 rotates about its own axis by a predetermined angle, that is, in each predetermined angle of the rotation of an engine crank shaft, not shown. In the illustrated embodiment, the disk 52 has 64 peripheral teeth and thus the rotational angle sensor 50 produces 64/2 output signals, or one output signal in each angle of $360°/32 = 11.25°$.

The accelerating pedal sensor 40 comprises a known potentiometer for sending information on the operating degree of the foot pedal, or an engine road demanded by the vehicle's driver to the control unit 26.

Based on the foregoing arrangement shown in FIGS. 1 and 2, an fuel injection quantity control system according to the present invention will be described with reference to FIGS. 3 through 10.

Initially, a brief description of the basis of the present invention will be described with reference to FIG. 3 prior to describing the operations performed by the control unit 26.

Figure 3:
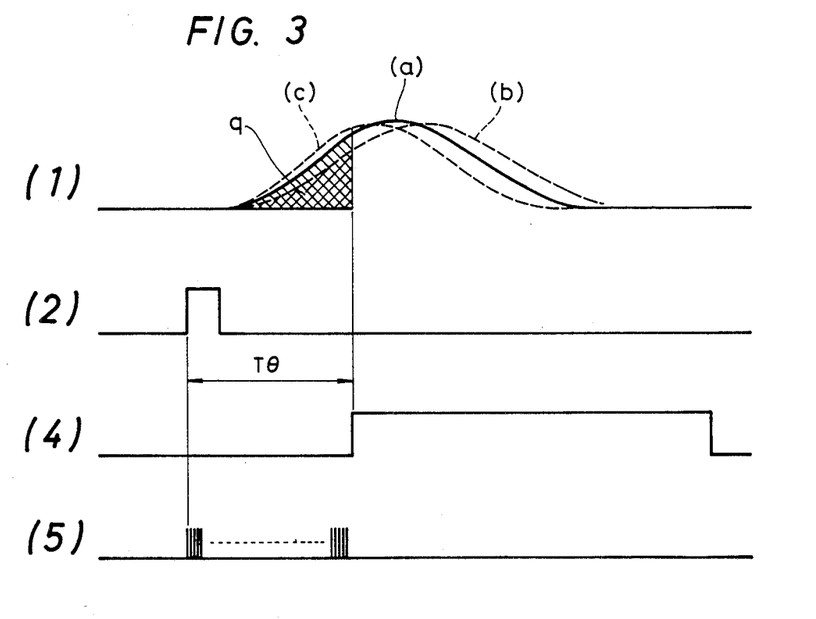
FIG. 3 is a timing chart useful for understanding the basis of the present invention.

FIG. 3 is a timing chart useful for understanding the basis of the present invention, the reference numeral (1) being indicative of the lifting distance of the plunger, the reference numeral (2) representing an output signal of the reference rotational angle sensor produced at a predetermined rotational phase angle of the fuel injection pump, the reference numeral (4) designating a pulse signal to be fed for the energization of the fuel-spill-metering solenoid-operated valve, and the reference numeral (5) being indicative of clock signals generated at intervals of 1-microsecond, for example. Of the lifting distance conditions of plunger indicated by the reference numeral (1), a curve (a) shown by a solid line represents a lifting condition when the rotational variations of the engine is not occurred, a curve (b) shown by a dashed line designating the same when the rotational speed is decreased, and a curve (c) representing the same when the rotational speed is increased.

The microcomputer 26 is responsive to load information and engine operating condition information from the rotational angle sensor 50, the accelerating pedal sensor 40, and non-illustrated temperature and pressure sensors for determining a quantity of fuel q to be injected into the cylinders of the engine, and derives a spilling start timing $T\theta$ from a two-dimentional map, for example, as a function of the determined fuel injection quantity and an engine rotational speed at the time. The energization of the fuel spill solenoid-operated valve is effected upon the elapse of a time period after the detection of the output signal of the reference rotational angle sensor, that is, on reaching the spilling start timing $T\theta$ for the purpose of the termination of the fuel injection.

However, as indicated by the chart, the engine rotational variations cause the variations of the lifting condition of the plunger and therefore the fuel injection quantity q varies in accordance with the lifting condition variations, thus resulting in the occurrence of an error with respect to the fuel injection quantity.

To perfectly eliminate this problem associated with the rotational variations, one possible solution would be to use a rotational angle sensor having an extremely high resolving power. However, considerable difficulty will be encountered to meet this requirement.

In accordance with the present invention, the reduction of the error is achieved by a combination of the counting of rotational angle signals from the rotational angle sensor and measurement of time, i.e. the counting of clock pulses by means of a timer counter. Although it is possible to effect a greater reduction of the spill timing error with the increase of the number of the rotational angle signals generated for one revolution of the pump drive shaft, it has found from the result of an examination that the number of rotational angle signals per one revolution thereof enough for obtaining the fuel injection quantity control accuracy actually required is 60 or more. That is, the rotational angle signal needs to be generated at intervals of less than 6° (unit angle, i.e., the angle between succesive peripheral teeth of the disk 52), corresponding to 30 or more per one revolution of the engine crank shaft. Accordingly, in this embodiment, the rotational angle sensor 50 is constructed such that the number of the signals produced in one revolution of the pump drive shaft is 65 and thus the signal is generated at intervals of 5.625°, corresponding to 11.25° CA (crank angle).

A control process will be described in detail with reference to FIGS. 4 through 11.

Figure 4:
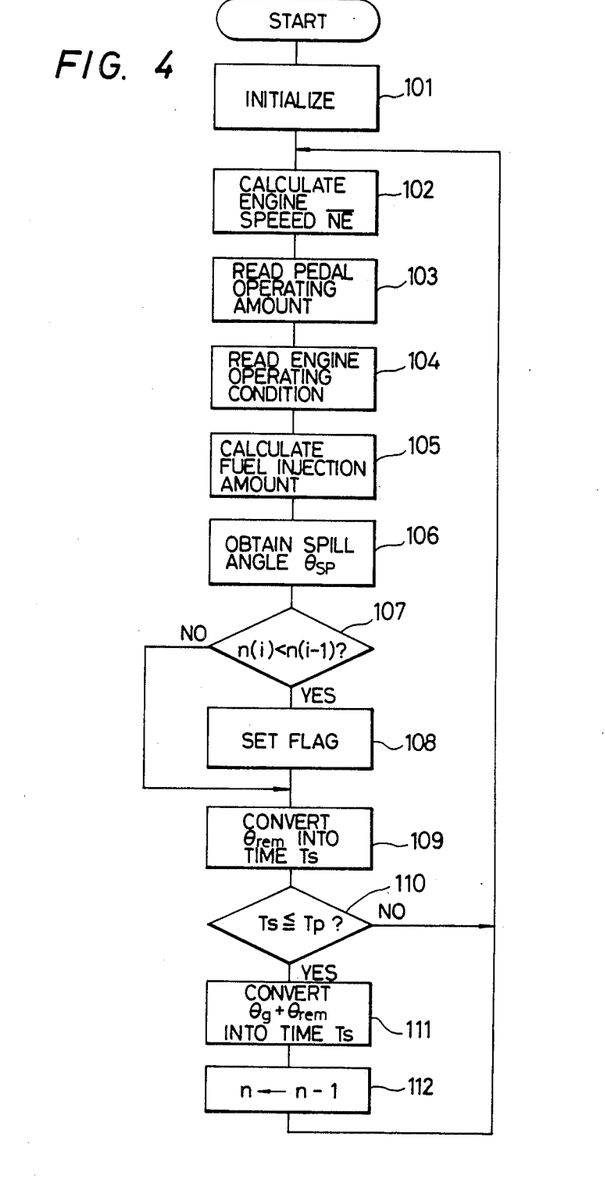
FIG. 4 is a flow chart illustrating a main routine executed in accordance with the program provided for the fuel injection quantity control system according to the present invention.

FIG. 4 is a flow chart of a main routine executed in response to a reset signal generated when a power source switch is turned on.

The main routine begins with a step 101 in which the initialization is executed, and the initialization step 101 is followed by a step 102 for calculating the average of engine rotational speed NE on the basis of the engine rotational speed information obtained in an interrupt routine shown in FIG. 5 which will be described hereinafter. The average speed value $\overline{NE}$ is calculated as the average of four speed values, each being derived at intervals of 45° CA (crank angle) in the interrupt routine, that is, it is given by the equation $$\overline{NE} = \sum_i^4 NE(i)/4.$$

A step 103 follows to obtain the operating amount of the acceleration foot pedal, and then a step 104 is executed to derive an engine operating condition as a function of engine coolant temperature, intake air temperature, intake air pressure and the like which are detected by various engine sensors. A subsequent step 105 is provided for calculating a desired fuel injection quantity q on the basis of the acceleration pedal operating amount and the engine operating condition obtained in the previous steps 103 and 104. A step 106 follows to derive a desired spill phase angle $\theta$sp, at which the fuel spill solenoid-operated valve is opened, from a two-demensional map as a function of the desired fuel injection quantity q and the average engine speed NE obtained in the steps 102 and 105. The desired spill phase angle $\theta$sp is divided into unit angles $\theta$g, obtaining a quotient n and a remainder angle $\theta$rem which are stored as two byte data in the microcomputer, the upper byte data indicating the quotient n and the lower byte data indicating the remainder angle $\theta$rem.

In a subsequent step 107, the microcomputer compares the present quotient value n (i) of the upper byte with the last quotient value n (i−1) thereof, and when n (i) $\geq$ n (i−1), a step 109 is executed. When n (i) < n (i−1), that is, when the desired spill phase angle $\theta$sp is rapidly decreased, a step 108 follows to set a flag F to "1", indicating the rapid decrease in the angle $\theta$sp. For this case, the process dealing with such a rapid decrease is executed in the interrupt routine shown in FIG. 5. A subsequent step 109 is provided for converting the remainder angle $\theta$rem into a time period Ts. This conversion is performed using the 180° CA period $T_{180}$ obtained in the interrupt routine of FIG. 5 and the time period Ts is given by the equation $Ts = T_{180} \times (\theta rem/180)$. The time period Ts is compared in a step 110 with a predetermined time period Tp indicating the time period required, for example, resulting from the fact that it is impossible to output a current signal to the solenoid-operated valve while the microcomputer is in the working condition for the other operations. If Ts > Tp, the operational flow returns to the step 102, and if Ts $\leq$ Tp, a step 111 follows to further calculate the time period Ts according to the equation $Ts = T_{180} \times [(11.25 + \theta rem)/180]$ and then a step 112 is executed to set the upper byte value n to n−1. Thereafter, the operational flow returns to the step 102 and this main routine is repeatedly executed as described above at intervals of 4 or 5 milliseconds, this operation cycle is quicker as compared with the period of detection of the reference rotational angle signal at an idling engine speed of 700 rpm.

Figure 5:
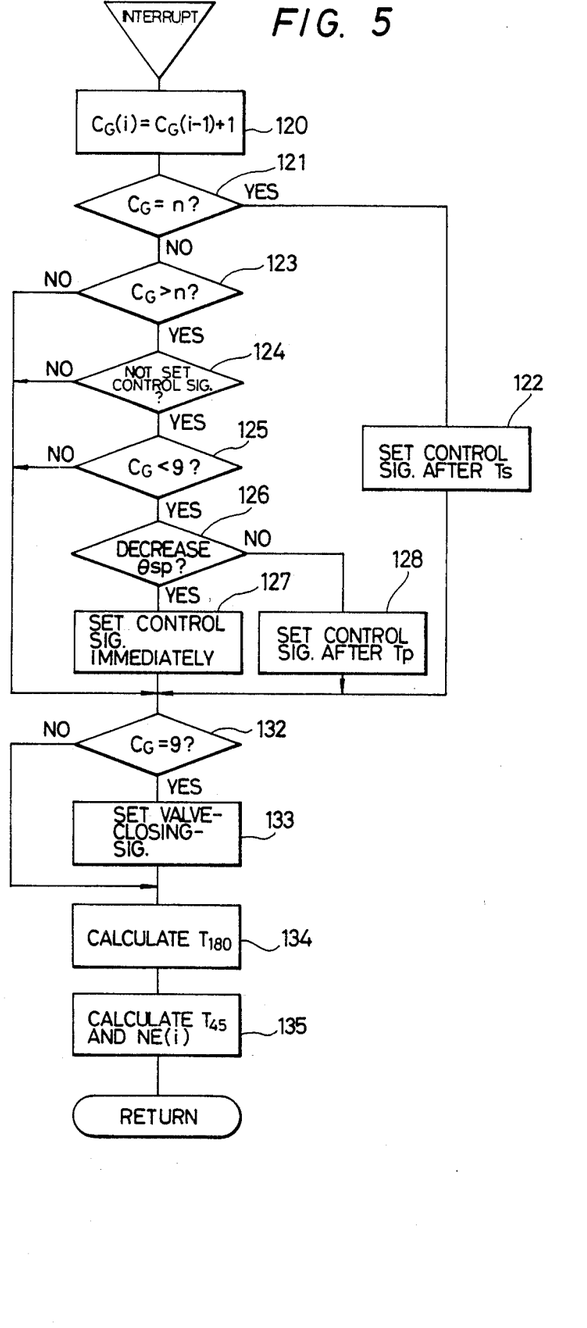
FIG. 5 is a flow chart showing an interrupt routine executed in response to a rotational angle signal from the rotational angle sensor of FIG. 2.

FIG. 5 is a flow chart of an interrupt routine executed in response to the leading edge of each of the rotational angle sensor signals.

Initially, a step 120 is executed to count the rotational angle sensor signals. This count value $C_g$ is reset to zero in a reference signal interrupt routine shown in FIG. 8, so that the counting operation in the step 120 is effected on the basis of a reference signal from the reference rotational angle sensor. In a subsequent step 121, the count value Cg is compared with the value n of the upper byte. If Cg=n, a step 122 follows to set so as to generate a control signal for the opening of the solenoid-operated spill valve upon the elapse of the converted time period Ts after the detection of a leading edge of the rotational angle sensor signal when Cg=n. For example, according to the 6801 type microcomputer, this process can easily be performed as follows.

The detection time $t_n$ of the leading edge of the rotational angle sensor signal is obtained by reading the value of the input-capture-register in which the value of the timer counter at the time the leading edge of the rotational angle sensor signal is detected is automatically held, and then the timing $t_{on}$ of turning-on of the solenoid-operated valve is set in the output-compare-register, the timing $t_{on}$ being obtained by adding the converted time Ts to the detection time $t_n$, and an ON level is set in a predetermined output bit. Thereafter, when the count value of the timer counter becomes equal to the time $t_{on}$ set in the output-compare-register, the ON level of the predetermined output bit is automatically outputted.

On the other hand, when Cg is not equal to the value n, control goes to a step 123, in which it is executed to check whether the generation timing of the valve-opening signal is over (Cg>n) or not (Cg<n). If Cg<n, control jumps to a step 132, on the other hand, if Cg>n, a step 124 follows to check whether the ON level has already been set on the detection of the previous rotational angle sensor signal. If so, control goes to the step 132. If not, a step 125 follows to check whether the valve-closing-timing is reached (Cg≧9) after the elapse of the valve-opening-timing. If so, control also goes to the step 132 so as not to output a valve-opening-signal. On the other hand, if not, a step 126 follows to check whether the desired spill phase angle $\theta$sp has rapidly been decreased or not in accordance with the condition of the flaf F set in the step 108 of the main routine of FIG. 4. If the flag is set to "1", that is, $\theta$sp is rapidly decreased, the microcomputer executes to output a valve-opening-signal as short time as possible in a step 127, in the same manner as in the step 122. When the slight variations of $\theta$sp cause the ON level time to set on the basis of the previous detection time of the rotational angle sensor signal, a step 128 is executed in which a valve-opening-signal is outputted upon the elapse of the predetermined time period Tp after the detection time $t_n$ of the leading edge of the rotational angle sensor signal.

In the step 132, the microcomputer checks in accordance with the count value Cg of the rotational angle sensor signals whether the valve-closing-timing has been reached after the valve-opening-timing, when reached, a step 133 follows to set the valve-closing-signal output and OFF timing after a predetermined time period in the same manner as in the step 122. Although the valve-closing-timing, in this embodiment, is set to Cg=9, it is also appropriate to set it in the range of 9≧Cg≧13 prior to the next fuel compression stroke. A subsequent step 134 is executed to calculate 180° CA period $T_{180}$ necessary for the time conversion. For example, this calculation is performed by measuring a time difference between the present detection time of Cg=13 and the next detection time of Cg=13 on the basis of the clock signals of the microcomputer. A subsequent step 135, 45° CA period $T_{45}$ is obtained at intervals of 45° CA and then the engine rotational speed is calculated using the obtained period $T_{45}$ as NE(i)=1/$T_{45}$. The average engine rotational speed NE calcultated in the step 102 of the main routine of FIG. 4 is used for the fuel injection quantity control according to the present invention. When one rotational angle sensor signal and one reference rotational angle signal are at the same time detected, the interrupt routine of FIG. 5 has priority over the reference signal interrupt routine and the reference signal interrupt routine is executed after the completion of the interrupt routine of FIG. 5, thus resulting in the presention of the collision of the operations.

Figure 6:
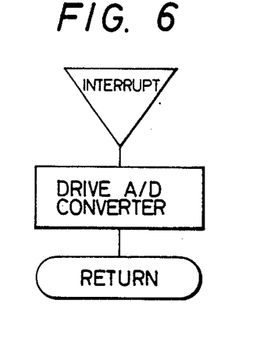
FIG. 6 is a flow chart of an interrupt routine executed for performing an analog-to-digital conversion at a predetermined period.
Figure 7:
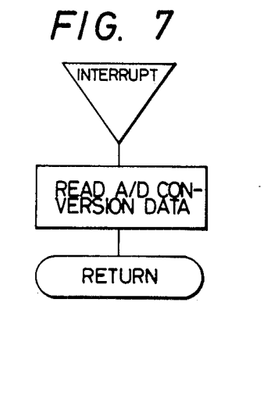
FIG. 7 is a flow chart illustrating an interrupt routine executed for reading digitalized data obtained by the A/D conversion of FIG. 6.

FIG. 6 shows a flow chart of an interrupt routine for operating an analog-to-digital converter at a predetermined period and FIG. 7 illustrates a flow chart of an interrupt routine for reading the digitalized data from the A/D converter.

A further description of the fuel injection quantity control according to the present invention will be described with reference to FIGS. 6 through 11.

Figure 9:
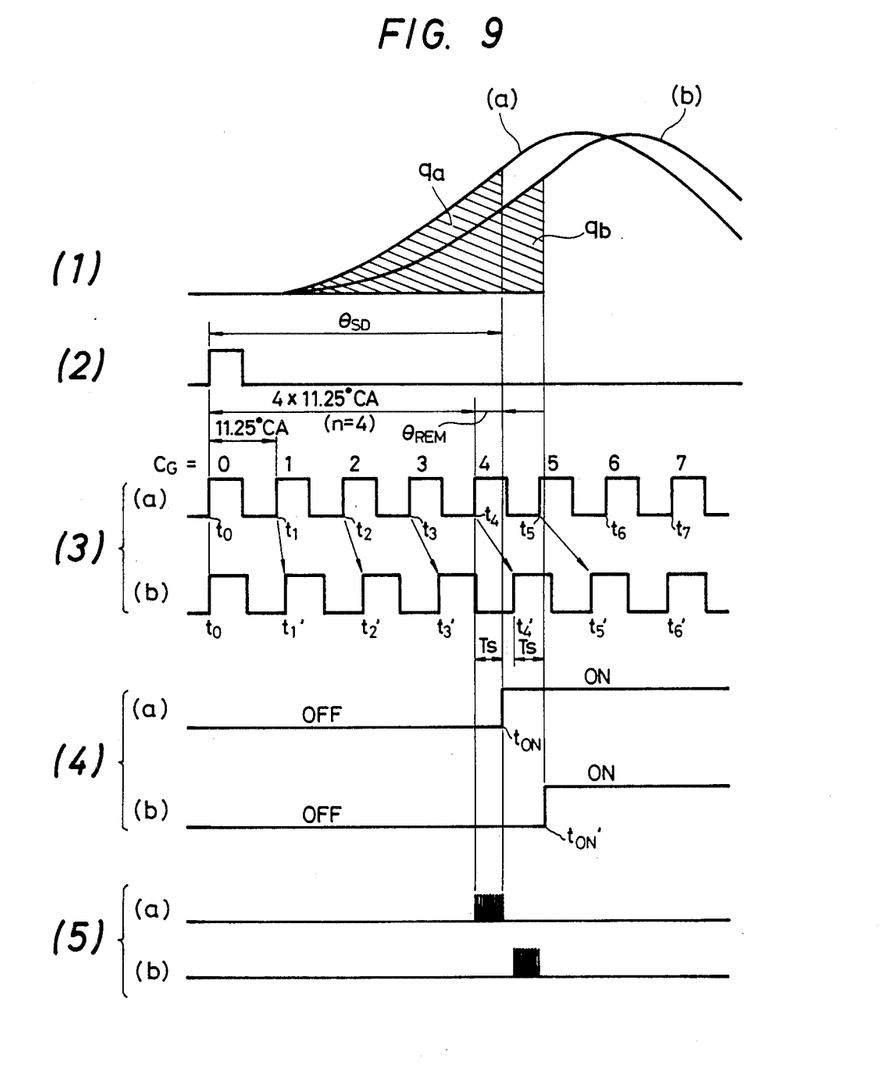
FIGS. 9 to 11 are timing charts for describing and understanding the present invention.

FIG. 9 is a timing chart useful for understanding the present invention, the reference numeral (1) being indicative of the lifting distance conditions of the plunger, the reference numeral (2) representing an output signal of the reference rotational angle sensor 30 produced at a predetermined rotational phase angle of the fuel injection pump, the reference numeral (3) representing pulse signals from the rotational angle sensor 50, the reference numeral (4) designating a pulse signal to be fed to the fuel-spill-metering solenoid-operated valve for the energization thereof, and the reference numeral (5) being indicative of clock signals generated at intervals of 1-microsecond. In the timing chart, the reference character (b) shows the lower engine rotational speed condition as compared with that shown by the reference character (a).

First, the description will be made for when the engine is operated in the plunger lifting condition (a).

Figure 8:
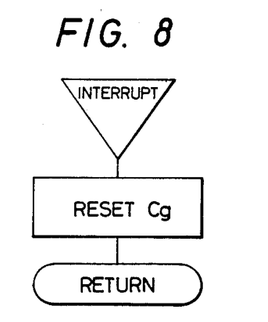
FIG. 8 is a flow chart showing an interrupt routine executed for reset the count value of the rotational angle signals to zero in response to the detection of a reference angle signal.

As described above, the reference rotational angle signal is detected at intervals of 180° CA in the interrupt routine of FIG. 8, and the interrupt routine of FIG. 5 is executed at intervals of 11.25° CA, corresponding to the generation of 16 rotational angle signals per 180° CA. When the solenoid-operated spill valve is turned on for the completion of the fuel injection upon the elapse of a desired spill phase angle $\theta$sp° CA on the basis of a reference angle, the microcomputer 26 executes the step 106 of the main routine of FIG. 6 to store in a memory thereof $\theta$sp/11.25=a quotient n and a remainder angle $\theta$rem, and then performs a conversion to time about the remainder angle $\theta$rem° CA on the basis of 180° CA period $T_{180}$ corresponding to the engine rotational speed, that is, calculates the equation $Ts=T_{180}\times(\theta rem/180)$. The 180° CA period $T_{180}$ is derived from the detection period of the reference rotational angle signal (2) or the detection period of the rotational angle signal detected at the phase equal to that of the reference rotational angle signal. Furthermore, the microcomputer 26 resets the counter to "0" in response to the rotational angle signal detected at the phase equal to that of the reference rotational angle signal and then counts the number of the rotational angle signals generated after the detection of the reference rotational angle signal, and further counts clock signals (5) by means of the timer counter on the basis of the time tn (n=4) the count value Cg becomes equal to the quotient n (Cg=4) and generates a pulse signal to be supplied to the solenoid-operated valve at the time $t_{on}$ elapsed by the time Ts after the time $t_n$, thereby obtaining a fuel injection quantity $q_a$.

On the other hand, when the lifting condition of the plumger (1) is varied as indicated by the reference character (b) resulting from the rotational variations (decrease) after the detection of the reference rotational angle signal, the rotational angle signal (3) also varies as shown by the reference character (b) in response to the variations of the plunger lifting condition and further the generation timing of the pulse signal (4) varies from $t_{on}$ to $t'_{on}$. This means that the pulse signal (4) can accurately be generated at $\theta sp°$ CA, irrespective of the variations of time, on the basis of the generation timing of the reference rotational angle signal, thereby obtaining a fuel injection quantity $q_b$ substantially equal to the injection quantity $q_a$.

Actually, when the microcomputer 26 generates a pulse signal to be fed to the solenoid-operated valve upon the elapse of the time Ts after $Cg=n^{th}$, a processing time Tpp is required for the operation. If the converted time Ts is smaller than the processing time Tpp, that is, it is required that the pulse signal be generated at the time extremely close to $n^{th}$ rotational angle signal, the microcomputer does not enable generating the pulse signal upon the elapse of the time Ts. Furthermore, the microcomputer is sometimes occupied by the other operations after the detection of the rotational angle signal and therefore there are a time period Tpw in which it is impossible to perform the operation for generating the pulse signal to be supplied to the solenoid-operated valve. Therefore, when the time Ts< the predetermined time Tp=Tpp +Tpw, the remainder angle $\theta$rem is set to $\theta'\text{rem}=\theta g+\theta\text{rem}$ and to $n=n-1$ where $\theta g$ represents unit angle corresponding to the detection period of the rotational angle signal, and the microcomputer performs a conversion to time with respect to $\theta'\text{rem}°$ CA as $Ts' = T_{180} \times (\theta'\text{rem}/180)$. In this case, the pulse signal (4) is generated upon the elapse of the time Ts' after the detection of $Cg=n-1$. These operations are executed in the steps 111 and 113 of the main routine of FIG. 4.

However, the longer the difference time between the generation timing $t_{on}$ of the solenoid-operated valve operating signal (4) and the detection timing $t_n$ of the rotational angle signal, the greater is the error of the generation timing of the pulse signal (4) caused by the rotational variations after the detection of $t_n$, and therefore it is desired to shorten the time Tpp and the time Tpw as much as possible. Accordingly, to meet the requirement, the calculation of $\theta sp/11.25°$ CA =a quotient n and a remainder angle $\theta$rem and the process for converting the remainder angle $\theta$rem to a time are in advance effected in the other control routine, and the counting of the rotational angle signal is performed in the interrupt routine of FIG. 5 and when the count value Cg is coincident with the quotient n, the solenoid-operated valve operating signal is generated upon the elapse of Ts or Ts' calculated in advance. As another example, it is also appropriate to effect the above calculation and process in a control routine executed in response to the detection of the reference rotational angle signal. However, although satisfactory for making simple the algorithm of the control, this has a disadvantage in that the operation period become longer when the engine rotational speed is relatively low and therefore it is difficult to quickly cope with the variations of the engine operating conditions.

With respect to the control, the following situation will be considered as a specific example. Namely, when the engine operating condition such as the operating degree of the acceleration pedal rapidly varies after the calculation of the quotient and the converted time Ts and immediately prior to the detection of $n^{th}$ rotational angle signal, the solenoid-operated valve opening angle is advanced from $\theta sp$ to $\theta sp$ $(<\theta sp-\theta g)$ and thus the quotient n sometimes varies to $n'(\leq n-1)$. However, in this point, the detection of $(n-1)^{th}$ rotational angle signal has already been terminated, and therefore it becomes impossible to generate the valve operating pulse signal at a desired timing and it is compelled to generate the signal at the initially set valve-opening timing $\theta sp$. The control to eliminate the above-noted problem will be described with reference to FIG. 10.

Figure 10:
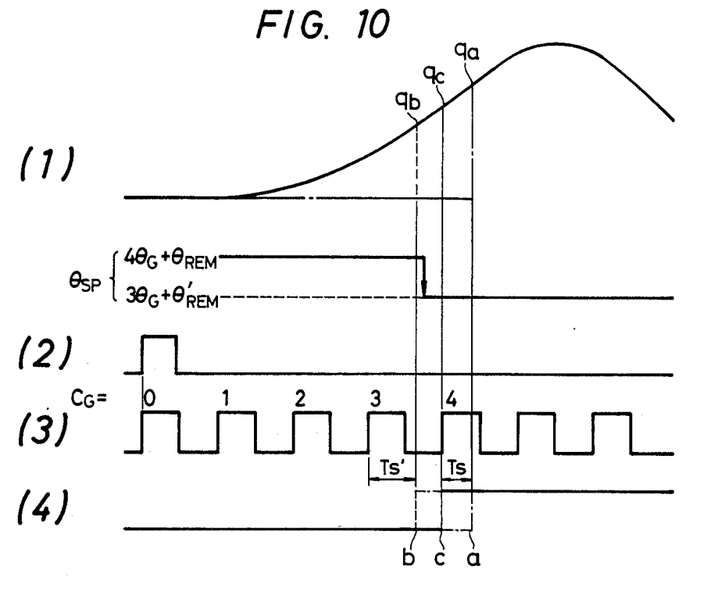

In FIG. 10, the reference characters (1) through (4) represent those of FIG. 9.

Initially, assuming that the desired valve opening timing $\theta sp$ is indicated by $4\times\theta g+\theta\text{rem}$ and the converted time Ts corresponding to $\theta$rem is greater than the predetermined time period Tp and the pulse signal (4) is generated at a time a in order to obtain a fuel injection quantity $q_a$. However, resulting from a decrease in the acceleration pedal operating amount after the detection of the reference rotational angle signal and the count value $Cg=3$, when it is required that the desired valve opening timing varies from $\theta sp$ to $\theta'sp=3\times\theta g+\theta'\text{rem}$ and the pulse signal (4) be generated at a time b elapsed by a time period Ts' after $Cg=3$ in order to obtain a fuel injection quantity $q_b$, the microcomputer 26 generates the pulse signal (4) at a time c elapsed by a minimum time (substantially equal to the processing time Tpp) after $Cg=4$ so that a fuel injection quantity $q_c$ can be obtained, resulting in the improvement of fuel injection quantity response in a transient period from the quantity $q_a$ to the quantity $q_b$. The step 108 of the main routine of FIG. 4 is provided for detecting the above-noted condition, in which the flag F is set to "1", and in accordance with the flag condition the valve opening is performed in the step 127 of the interrupt routine of FIG. 5.

Figure 11:
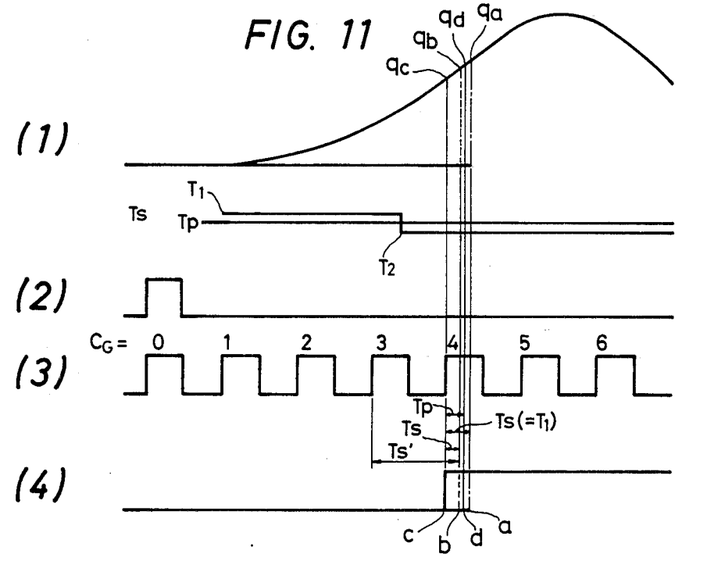

Furthermore, as shown in FIG. 11 in which the reference characters (1) through (4) represent those of FIG. 10, when the desired injection quantity slightly varies prior to the detection of $Cg=4$ in a relatively stable engine operating condition, the converted time period Ts varies from a time period T1 slightly greater than the predetermined time period Tp to a time period T2 slightly smaller than the time period Tp and therefore the valve opening timing should be established on the basis of the timing of $Cg=3$. In this case, the microcomputer generates the valve opening pulse signal (4) at a time d elapsed by the predetermined time period Tp after the detection of $Cg=4$ in the step 128 of the interrupt routine of FIG. 5 so as to obtain a fuel injection quantity $q_d$ substantially equal to a fuel injection quantity $q_b$ obtained when the pulse signal is generated at a time b elapsed by a desired time period Ts'. This enables obtaining a higher accurate fuel injection quantity as compared with the case that the pulse signal (4) is generated upon the elapse of the minimum time after $Cg=4$.

In the microcomputer 26, the desired spill phase angle $\theta sp$ corresponding to the desired fuel injection quantity q is recorded as several byte data in which the least significant bit (LSB) of the upper byte is provided for unit angle, that is, the angle between successive teeth of the rotational angle sensor by which the rotational angle signals are produced, and therefore it is not actually required to calculate $\theta sp/\theta g=a$ quotient and a remainder angle $\theta$rem. The upper byte data directly indicates the quotient and the other byte data indicates the remainder angle $\theta$rem, resulting in the simplicity of the process and the shortening of the processing time. For example, when θsp data is stored as two byte data each being constructed by eight bits and the least significant bit (LSB) of the upper byte indicates 11.25° CA, the two byte data value indicating θsp = 50.626° CA is 50.625×($2^8$/11.25)=1152 and "0480" in hexadecimal, that is, the high-order byte data is "04" in hexadecimal (4 in decimal system) and the low order byte data is "80" in hexadecimal (128 in decimal system). The low order byte data indicates 11.25×(128/$2^8$) =5.625° CA. Therefore, the quotient 4 and remainder angle 5.625° CA of the division 50.625/11.25 correspond to the high order byte data and the low order byte data respectively.

Figure 12:
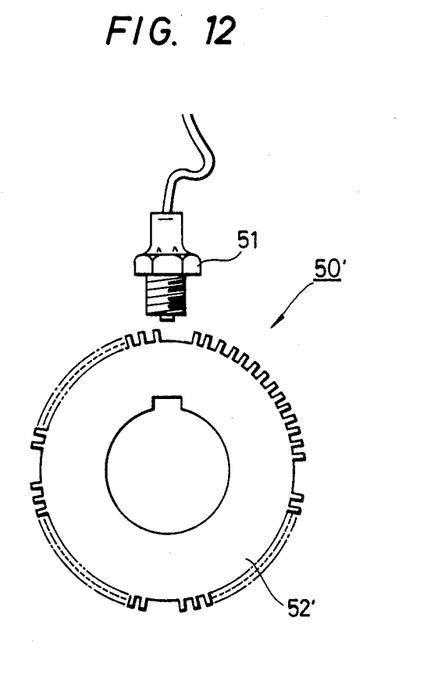
FIG. 12 illustrates another arrangement of the rotational angle sensor which is combined with a reference angle sensor.
Figure 13:
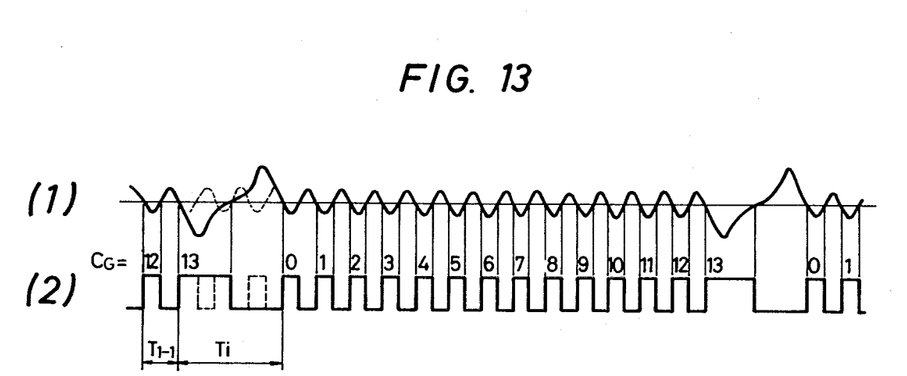
FIG. 13 is a timing chart showing signals obtained by the rotational angle sensor of FIG. 12.

FIG. 12 illustrates another example of the rotational angle sensor 50'. as seen from the figure, the two teeth of the disk 52' immediately prior to the detection of the reference rotational angle signal are removed. With such a arrangement of the disk, the signal (1) shown in FIG. 13 is obtained by the electromagnetic pickup 51. The signal (1) from the electromagnetic pickup 51 is shaped through a well known waveform shaping circuit into a pulse signal (2). Accordingly, 13 pulses are obtained at intervals of 180° CA (90° rotation of the pump drive shaft), that is, one pulse is obtained at intervals of 11.25° CA and a pulse is obtained at intervals of 11.25×3° CA. A detection period Ti of the pulse signal is compared with the previous detection period Ti−1. If Ti>Ti−1, for example, Ti is in excess of two times Ti−1, the rotational angle pulse is determined as a reference rotational angle signal and the count value Cg of the counter is set to zero. Therefore, it is possible to detect the rotational angle signal and the reference rotational angle signal by one sensor. The number of teeth to be removed is not limited.

Figure 14:
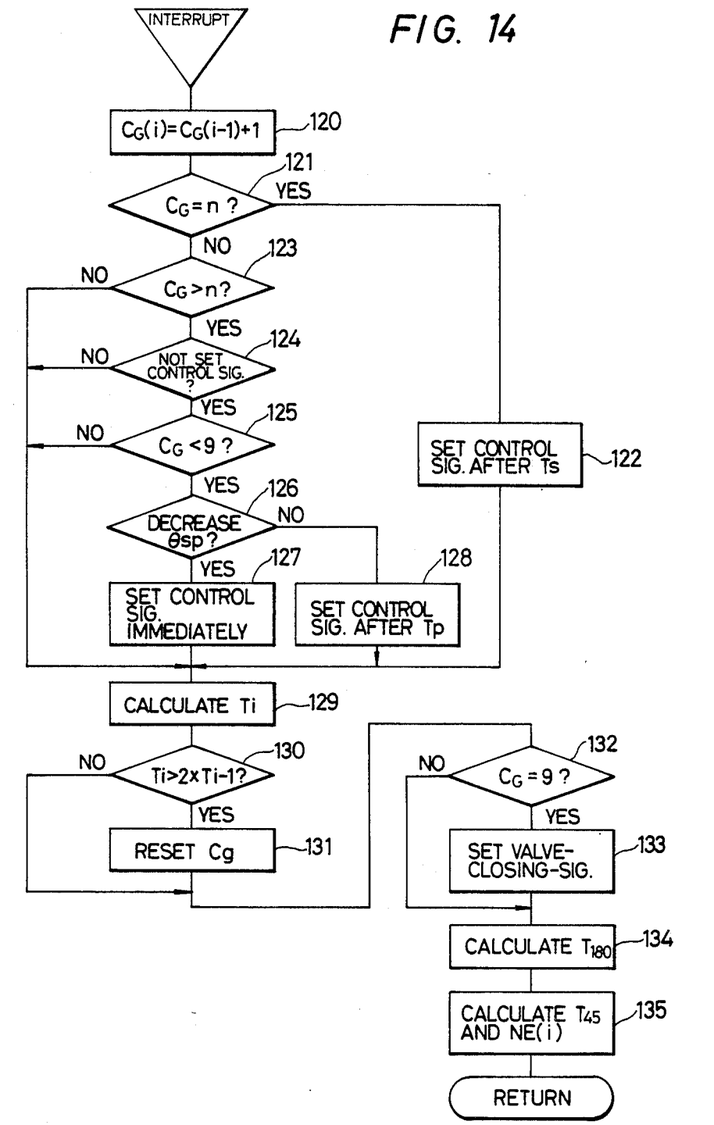
FIG. 14 is a flow chart illustrating an interrupt routine executed instead of the interrupt routine of FIG. 5 when the rotational angle sensor of FIG. 12 is employed in the present invention.

FIG. 14 is a flow chart illustrating the operation for when the second arrangement of the sensor is employed.

In this case, the interrupt routine of FIG. 8 is not required and instead, steps 129 to 131 are newly added to the routine of FIG. 5. Namely, in the step 129, the rotational angle signal period Ti is obtained and the step 130 follows to compare the present period Ti with the previous period Ti−1. If Ti>2×Ti−1, the present detected rotational angle pulse is determined as a reference rotational angle signal and the count value Cg is reset to zero. The other operations are executed in the same manner as in the interrupt routine of FIG. 5 and therefore the description is omitted for brevity.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A method of controlling a fuel injection quantity into cylinders of a diesel engine combined with a fuel injection pump having a solenoid-operated spill valve, comprising the steps of:
   (a) sensing a plurality of engine operating conditions including an engine rotational speed and an operating amount of an accelerating pedal of said engine;
   (b) calculating a desired fuel injection quantity into said cylinders of said engine in accordance with the sensed engine operating conditions;
   (c) deriving a desired spill phase angle of rotation of said pump drive shaft as a function of the calculated fuel injection quantity;
   (d) producing a reference rotational angle signal at a reference angle of rotation of a drive shaft of said fuel injection pump;
   (e) producing a rotational angle signal for each predetermined angle of rotation of said drive shaft of said fuel injection pump;
   (f) obtaining a quotient and a remainder angle by dividing the derived spill phase angle by said predetermined angle;
   (g) converting the obtained remainder angle into a first converted time on the basis of the sensed engine rotaional speed;
   (h) counting the number of the rotational angle signals produced after the production of the reference rotational angle signal;
   (i) comparing the first converted time with a predetermined time;
   (j) if the first converted time is equal to or smaller than said predetermined time, converting said predetermined angle and said remainder angle into a second converted time;
   (k) generating a control signal upon the elapse of the second converted time after a counting of a number of rotational angle signals smaller by one than a number thereof which is coincident with the quotient; and
   (l) supplying said control signal to said solenoid-operated spill valve for cutting off a fuel supply into said engine cylinders.

2. A method as claimed in claim 1, further comprising a step (m) of controlling a generation timing of said control signal in accordance with the variations of the engine operating conditions.

3. A method as claimed in claim 2, wherein the step (m) includes a step of detecting a variation of the engine operating condition by comparing the present desired spill phase angle with a last desired spill phase angle.

4. A method as claimed in claim 3, further including a step of generating said control signal immediately after the count value reaches said quotient when the variation of the engine operating condition is detected immediately prior to counting the number of the rotational angle signals equal to said quotient after the counting of the number of the rotational angle signals smaller by one than said quotient.

5. A method as claim in claim 2, wherein the step (m) includes a step of detecting the variation of the engine operating condition by comparing the converted time with said predetermined time.

6. A method as claimed in claim 5, further including a step of generating said control signal upon the elapse of said predetermined time after the number of the rotational angle signals is coincident with the quotient when it is detected that the converted time is smaller than said predetermined time.

7. A system for controlling a fuel injection quantity into cylinders of a diesel engine combined with a fuel injection pump having a solenoid-operated spill valve, comprising:
   (a) first sensor means for sensing engine operating conditions including engine rotational speed and operating amount of an accelerating pedal of said engine;

(b) first means for calculating a desired fuel injection quantity into said cylinders of said engine in accordance with the sensed engine operating conditions;

(c) second means for deriving a desired spill phase angle of rotation of a drive shaft of said pump as a function of the calculated fuel injection quantity;

(d) third means for producing a reference rotational angle signal at a reference angle of rotation of a drive shaft of said fuel injection pump;

(e) fourth means for producing a rotational angle signal for each predetermined angle of rotation of said drive shaft of said fuel injection pump;

(f) fifth means for obtaining a quotient and a remainder angle by dividing the derived spill phase angle by said predetermined angle;

(g) sixth means for converting the obtained remainder angle into a first converted time on the basis of the sensed engine rotational speed;

(h) seventh means for counting the number of the rotational angle signals produced after the production of the reference rotational angle signal;

means for comparing the first converted time with a predetermined time;

means for converting said predetermined angle and said remainder angle into a second converted time if the first converted time is equal to or smaller than said predetermined time;

means for generating a control signal upon the elapse of the second converted time after a counting of a number of the rotational angle signals smaller by one than a number thereof which is coincident with the quotient; and means for supplying said control signal to said solenoid-operated spill valve for cutting off a fuel supply into said engine cylinders.

8. A system as claimed in claim 7, further comprising means for controlling a generation timing of said control signal in accordance with variations of the engine operating conditions.

9. A system as claimed in claim 8, wherein said control means includes means for detecting the variation of the engine operating condition by comparing the present desired spill phase angle with the last desired spill phase angle.

10. A system as claimed in claim 9, further including means for generating said control signal immediately after the count value reaches said quotient when the variation of the engine operating condition is detected immediately prior to counting the number of the rotational angle signals equal to said quotient after the counting of the number of the rotational angle signals smaller by one than said quotient.

11. A system as claim in claim 8, wherein said control means includes means for detecting the variation of the engine operating condition by comparing the converted time with said predetermined time.

12. A system as claimed in claim 11, further including means for generating said control signal upon the elapse of said predetermined time after the number of the rotational angle signals is coincident with the quotient when it is detected that the converted time is smaller than said predetermined time.

13. A system as claimed in claim 7, wherein said fifth means has a format in which two byte data indicate said quotient and said remainder angle respectively, the least significant bit of the upper byte indicating said predetermined angle.

14. A system as claimed in claim 7, wherein said third and fourth means comprises a detector having a disk and an electromagnetic pickup, said disk being mounted on said drive shaft of said fuel injection pump and having a plurality of teeth on an outer peripheral surface thereof, said teeth being arranged so as to produce said reference angle signal at said reference angle of rotation of said pump drive shaft and to produce a rotational angle signal at said predetermined angle thereof.

* * * * *